United States Patent
Soltys et al.

(10) Patent No.: US 8,806,976 B2
(45) Date of Patent: Aug. 19, 2014

(54) BRAKE PEDAL ASSEMBLY HAVING NON-CONTACTING SENSOR

(75) Inventors: Jarek Soltys, Calgary (CA); Adil Khan, Windsor (CA); Jessica L Sagan, Dearborn, MI (US); Peter Francis Worrel, Troy, MI (US); Mark Warren Muddiman, Belleville, MI (US)

(73) Assignees: KSR Technologies Co., Ridgetown, Ontario (CA); Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/402,028

(22) Filed: Feb. 22, 2012

(65) Prior Publication Data

US 2013/0055847 A1    Mar. 7, 2013

Related U.S. Application Data

(63) Continuation-in-part of application No. 12/858,766, filed on Aug. 18, 2010.

(51) Int. Cl.
| | | |
|---|---|---|
| *G05G 1/30* | (2008.04) | |
| *G05G 5/03* | (2008.04) | |
| *G05G 1/38* | (2008.04) | |
| *B60T 7/04* | (2006.01) | |

(52) U.S. Cl.
CPC .. *G05G 5/03* (2013.01); *G05G 1/38* (2013.01); *B60T 7/042* (2013.01)
USPC .......................................................... 74/512

(58) Field of Classification Search
USPC .......................................... 74/512, 513, 560
See application file for complete search history.

(56) References Cited

U.S. PATENT DOCUMENTS

| | | |
|---|---|---|
| 3,388,610 A | 6/1968 | Pyle et al. |
| 4,290,507 A | 9/1981 | Brown |
| 4,875,385 A | 10/1989 | Sitrin |
| 4,915,075 A | 4/1990 | Brown |
| 5,063,811 A | 11/1991 | Smith et al. |
| 5,415,144 A | 5/1995 | Hardin et al. |
| 5,460,061 A | 10/1995 | Redding et al. |
| 5,507,201 A | 4/1996 | Fairbairn et al. |

(Continued)

FOREIGN PATENT DOCUMENTS

| | | |
|---|---|---|
| DE | 2648816 A | 5/1978 |
| DE | 19733512 A1 | 2/1999 |

(Continued)

*Primary Examiner* — Vicky Johnson
(74) *Attorney, Agent, or Firm* — Raymond Coppiellie; Brooks Kushman P.C.

(57) ABSTRACT

A pedal assembly using a non-contacting position sensor utilizing a spring-biased roller on a cam surface to simulate the feel of a conventional brake pedal is provided. The pedal assembly includes an elongated brake support bracket having a cam surface and a pedal arm having a spring-biased roller. A spring-biased roller assembly is mounted to an inward side or beside the pedal arm or on both sides of the pedal arm. The roller assembly includes a fixed leg extending on from an inner side of the pedal arm and a movable leg which is pivotally mounted to the pedal arm. A biasing member extends over the support between the fixed leg and movable leg to generate a biasing force against the roller. When the pedal is depressed, the roller is moved along the cam surface of the support bracket thereby creating the 'feel' of a traditional pedal assembly.

6 Claims, 4 Drawing Sheets

(56) References Cited

U.S. PATENT DOCUMENTS

| | | |
|---|---|---|
| 5,615,749 A | 4/1997 | Kato |
| 5,848,558 A | 12/1998 | Isono et al. |
| 5,996,439 A | 12/1999 | Elton et al. |
| 6,006,626 A | 12/1999 | Notake et al. |
| 6,070,488 A | 6/2000 | Yabusaki et al. |
| 6,089,342 A | 7/2000 | Muller et al. |
| 6,216,580 B1 | 4/2001 | Kobayashi et al. |
| 6,298,746 B1 | 10/2001 | Shaw |
| 6,339,971 B1 | 1/2002 | Kato |
| 6,408,711 B1 | 6/2002 | Mizuma et al. |
| 6,481,311 B1 | 11/2002 | Sanagi et al. |
| 6,571,659 B2 | 6/2003 | Choi |
| 6,655,489 B2 | 12/2003 | Kawai et al. |
| 6,701,800 B2 | 3/2004 | Saitou et al. |
| 6,708,792 B2 | 3/2004 | Hirata |
| 6,786,109 B2 | 9/2004 | Mueller et al. |
| 6,945,134 B2 | 9/2005 | Ersoy et al. |
| 7,077,028 B2 | 7/2006 | Misonou et al. |
| 7,090,046 B2 | 8/2006 | Nebuya et al. |
| 7,240,581 B2 | 7/2007 | Lee |
| 7,267,194 B2 | 9/2007 | Miyoshi |
| 7,340,977 B2 | 3/2008 | Agnew et al. |
| 7,415,909 B2 | 8/2008 | Miyoshi et al. |
| 7,428,856 B2 * | 9/2008 | Podkopayev .................. 74/560 |
| 7,434,648 B2 | 10/2008 | Hayashi |
| 7,516,683 B2 | 4/2009 | Jasseron |
| 2004/0237700 A1 | 12/2004 | Wurn |
| 2004/0259687 A1 | 12/2004 | Ritter et al. |
| 2005/0050980 A1 | 3/2005 | Park |
| 2005/0082909 A1 | 4/2005 | Constantakis et al. |
| 2005/0145057 A1 | 7/2005 | Fujiwara |
| 2005/0172753 A1 | 8/2005 | Fujiwara |
| 2005/0252334 A1 | 11/2005 | Podkopayev |
| 2007/0000708 A1 | 1/2007 | Himetani |
| 2007/0227289 A1 | 10/2007 | Choi et al. |
| 2007/0266815 A1 | 11/2007 | Johansson |
| 2008/0000709 A1 | 1/2008 | Tanigawa et al. |
| 2008/0303340 A1 | 12/2008 | Crombez et al. |
| 2009/0000418 A1 | 1/2009 | Kim et al. |
| 2009/0235777 A1 | 9/2009 | Sand et al. |
| 2011/0041647 A1 | 2/2011 | Soltys |

FOREIGN PATENT DOCUMENTS

| | | | |
|---|---|---|---|
| DE | 602004003782 T2 | 10/2007 | |
| EP | 0107445 A1 | 5/1984 | |
| EP | 659615 A1 | 6/1995 | |
| EP | 8227885 A1 | 3/1998 | |
| EP | 847900 A1 | 6/1998 | |
| EP | 928727 A2 | 7/1999 | |
| EP | 2276556 A1 | 1/2001 | |
| EP | 1260419 A1 | 11/2002 | |
| EP | 1308357 A1 | 5/2003 | |
| EP | 1318051 A2 | 6/2003 | |
| EP | 1323602 A1 | 7/2003 | |
| EP | 827874 B1 | 11/2003 | |
| EP | 1371525 A2 | 12/2003 | |
| EP | 1510426 A2 | 3/2005 | |
| EP | 1557330 A2 | 7/2005 | |
| EP | 1600344 A1 | 11/2005 | |
| EP | 1980460 A1 | 10/2008 | |
| EP | 2276257 A1 | 1/2011 | |
| ES | 2276257 T3 | 6/2007 | |
| ES | 2276556 B1 | 6/2008 | |
| FR | 2843569 A1 | 2/2004 | |
| FR | 2885574 A1 | 11/2006 | |
| FR | 2899174 A1 | 10/2007 | |
| FR | 2967224 A1 * | 5/2012 | ............ B60K 23/02 |
| GB | 10432.3 A | 3/1917 | |
| GB | 2353009 A | 2/2001 | |
| JP | 3269372 A | 11/1991 | |
| JP | 9216528 A | 8/1997 | |
| JP | 11043073 A | 2/1999 | |
| JP | 11059350 A | 3/1999 | |
| JP | 2000280874 A | 10/2000 | |
| JP | 2003191829 A | 7/2003 | |
| JP | 2004249959 A | 9/2004 | |
| JP | 2004334889 A | 11/2004 | |
| KR | 100410780 B1 | 12/2003 | |
| KR | 20020022675 B1 | 12/2003 | |
| WO | 02081277 A1 | 10/2002 | |
| WO | 03062029 A1 | 10/2003 | |
| WO | 2005049389 A1 | 6/2005 | |
| WO | 2005078547 A1 | 8/2005 | |
| WO | 2008142193 A1 | 11/2008 | |
| WO | 2011021094 A1 | 2/2011 | |

* cited by examiner

BRAKE PEDAL ASSEMBLY HAVING NON-CONTACTING SENSOR

CROSS-REFERENCE TO RELATED APPLICATIONS

This application is a continuation-in-part of Ser. No. 12/858,766, filed on Aug. 18, 2010, entitled BRAKE PEDAL ASSEMBLY HAVING NON-CONTACTING SENSOR, now abandoned. This application is a continuation-in-part of U.S. application Ser. No. 13/021,288, filed Feb. 4, 2011, now issued as U.S. Pat. No. 8,474,348, which claims priority to application Ser. No. 61/337,500 filed Feb. 4, 2010. Applicants claim priority under 35 U.S.C. §§ 119(e) and 120 to the above listed applications.

TECHNICAL FIELD

The present invention relates generally to brake pedals and, more particularly, to a brake pedal assembly having a non-contacting sensor.

BACKGROUND

It is known to use position sensors on pedal assemblies for "by wire" vehicle controls such as brake pedals and gas pedals. The position sensor generates an electrical signal indicative of the amount of depression of the pedal. A controller uses this signal to control the operation of a throttle or braking assembly. However, it is desirable to provide these pedal assemblies with a resistance to depression or "feel" which is similar to that of a conventional pedal assembly. Accordingly, it is desirable to provide a pedal assembly for a vehicle using a position sensor which simulates the feel of a conventional brake pedal which is light weight and inexpensive to produce.

SUMMARY

A pedal assembly is provided using a non-contacting position sensor utilizing a spring-biased roller on a cam surface to simulate the feel of a conventional brake pedal. The pedal assembly includes an elongated brake support bracket having a cam surface and a pedal arm having a spring-biased roller. A pair of arms extends from one end of the bracket. The arms are spaced apart to accept a top portion of the pedal arm. A pivot rod extends through the arms and pedal arm to support the pedal arm for pivotal motion. A non-contacting rotational position sensor is mounted on one of the arms.

The pedal arm is an elongated member supported at one end by the pivot rod and having a pedal pad at the opposite end. A spring-biased roller assembly is mounted to an inward side or beside the pedal arm. The roller assembly includes a fixed leg extending on from an inner side of the pedal arm and a movable leg which is pivotally mounted to the pedal arm. A roller support has a pair of spaced apart flanges for supporting a roller, one end is attached to the free end of the movable leg and the other end of the roller support is pivotally attached to the fixed leg.

A biasing member extends over the support between the fixed leg and movable leg to generate a biasing force against the roller. When the pedal is depressed, the roller is moved along the cam surface of the support bracket. The radius of curvature of the cam is coordinated with the force of the spring to produce a load which simulates the feel of a conventional brake pedal assembly.

DETAILED DESCRIPTION

Detailed embodiments of the present invention are disclosed herein. However, the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to employ the present invention.

As pedal assembly 10 using a non-contacting position sensor utilizes a spring-biased roller on a cam surface to simulate the feel of a traditional brake pedal. The pedal assembly 10 is particularly suited for hybrid vehicles. As the pedal is depressed, the amount of load required to further depress the pedal increases.

Figure 1:
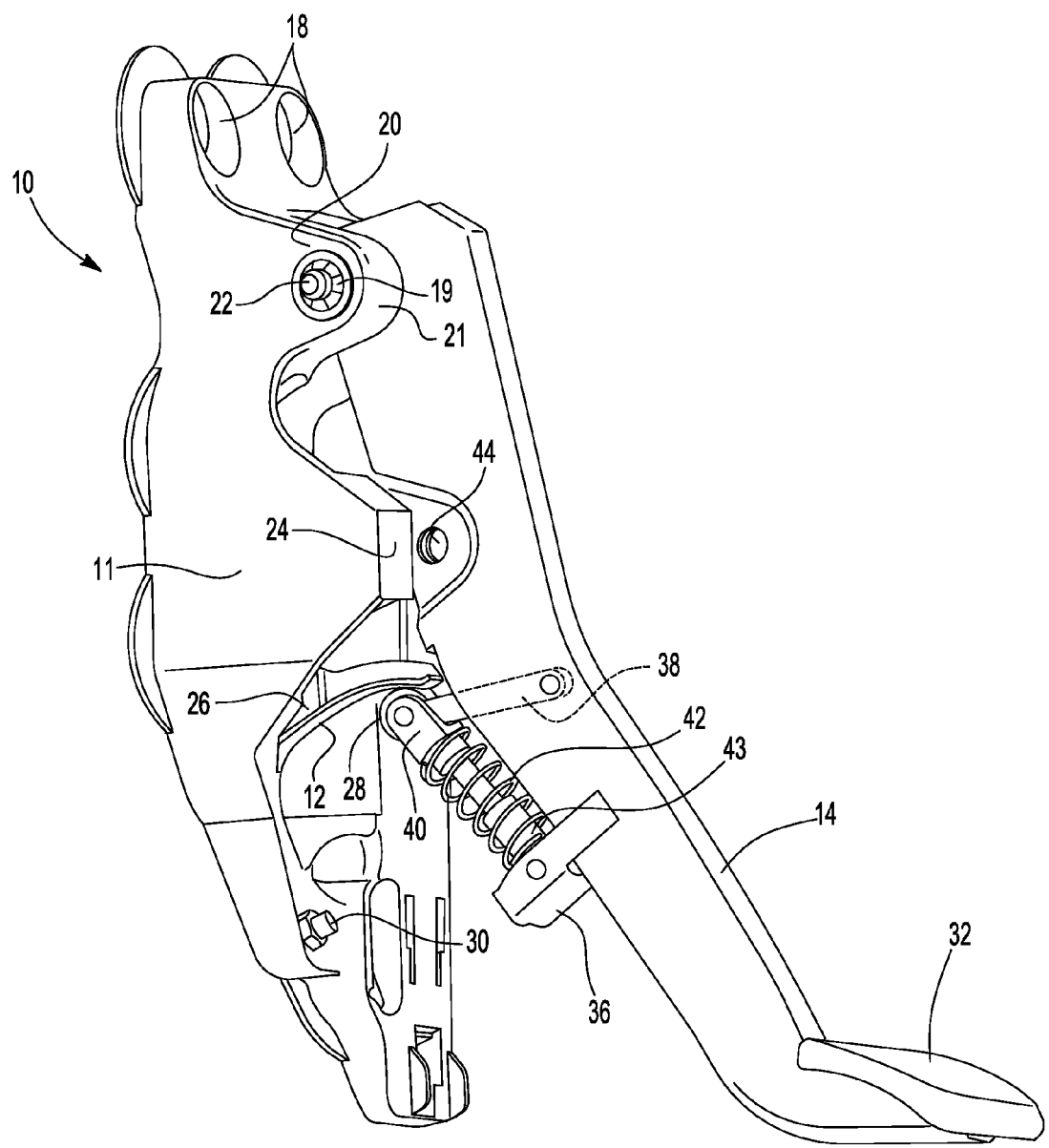
FIG. 1 is a perspective view of the pedal assembly where the pedal arm is not depressed.

The pedal assembly 10 includes a brake support bracket 11 and a support 26 having a cam surface 12. The pedal assembly 10 further includes a pedal arm 14 having a spring-biased roller 28 as shown in FIG. 1. The support 26 is an elongate member having the base bracket 11. The pedal assembly 10 having apertures 18 for mounting to the vehicle. A pair of arms 20 extends from one the pedal assembly 10. The arms 20 are spaced apart to accept a top portion of the pedal arm 14.

A pivot rod 22 extends through the arms 20 and pedal arm 14 to support the pedal arm 14 for pivotal motion. The interaction between the pivot rod 22, the arms 20 and the pedal arm 14 form a pivot point at pivot rod 22 where the pedal arm 14 can easily pivot about. Push nut 19 retains the pivot rod 22.

Figure 2:
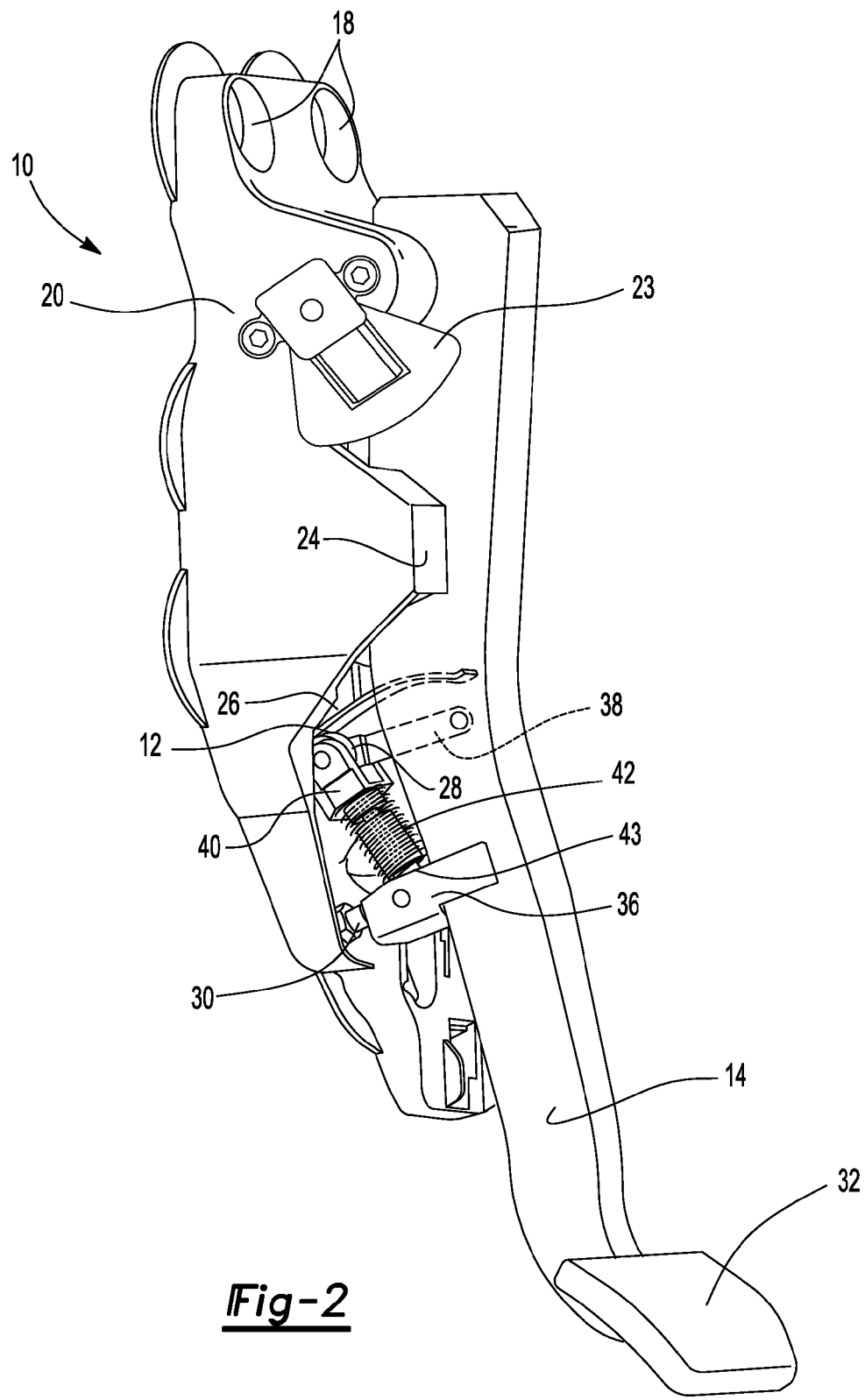
FIG. 2 is a perspective view of the pedal assembly having a non-contacting position sensor wherein the pedal arm is fully depressed.

A non-contacting rotational position sensor 23 is mounted on one of the arms 20 as shown in FIG. 2. Many different types of non-contacting position sensors can be used, such as eddy current and Hall Effect sensors, however in the preferred embodiment the position sensor of the type disclosed in U.S. Pat. Nos. 7,221,154; 7,276,897 and 7,345,473.

A mounting area 24 for a switch for controlling the deactivation of a cruise control is also provided. Extending from a middle portion of the base portion is a mounting area 24 for support of the cruise deactivation switch.

Also extending upwardly from the base is the support 26 having the cam surface 12. The cam surface supports the roller 28 attached on the pedal arm as discussed more fully below. The support 26 and cam surface 12 is made of a plastic, polymer or metal material. The cam surface 12 may have different finishes, such as smoother or rougher surfaces, to further manipulate the feel of the pedal assembly 10 when in operation by the driver to simulate the feel of a traditional brake pedal. The support 26 is preferably molded of a suitable plastic and the cam surface 12 may be formed of a plastic molded over a metal substrate.

Opposite the apertures 18 along the length of the pedal assembly 10 is a pin 30 which extends outwardly to act as a stop to the pedal arm. The pin 30 is made of a plastic, polymer or soft material as to not damage the pedal arm 14. The pin 30 may also be made of a metal.

As shown in FIG. 1, the pedal arm 14 is an elongated member supported at one end by the pivot rod 22 and having a pedal pad 32 at the opposite end. The pedal pad 32 includes a plastic or polymer material to facilitate gripping of the driver's shoe to the pedal arm. A spring-biased roller 28, roller support 40 and spring 42 are mounted to an inward side or beside the pedal arm 14. A fixed leg 36 extending from an inner side of the pedal arm 14 and a movable leg 38 which is pivotally mounted to the pedal arm 14. A roller support 40 has a pair of spaced apart flanges for supporting a roller, one end is attached to the free end of the movable leg and the other end of the roller support 40 is pivotally attached to the fixed leg 36. The roller support 40 varies in configuration as shown by the accompanying figures.

A spring 42 extends between spring support 43 (pivotally linked to movable leg 38) and the roller support 40 generating a biasing force against roller 28. The roller 28 may be provided with bearings and a smooth surface so that the roller moves evenly along the cam surface. When the pedal arm 14 is depressed, the roller 28 is moved along the cam surface 12 of the support bracket 11.

The curvature of the cam surface 12 is such that the roller is forced inwardly towards the fixed leg 36 to compress the spring and increase the load or resistance to depression. The radius of curvature of the cam surface 12 is coordinated with the force of the spring to produce a load which simulates the feel of a conventional brake pedal assembly. Higher and lower radiuses of curvature of the cam surface produce different impacts of force felt by the driver. The varying degrees of force produced by the roller 28, spring 42 and the cam surface 12 are modified according to the requirements of the driver.

As shown in FIG. 2, the pedal arm 14 is in a depressed position. The compressed pedal arm 14 depicts the position of the pedal arm when a vehicle driver is braking to the fullest capacity in conventional braking mode. The pedal aim 14 having the pedal pad 32 pivots about the pivot point at pivot rod 22. Located atop or near the pivot point at pivot rod 22 and on one of the arms 20 is the sensor 23. The pedal assembly 10 further includes apertures 18 to mount the pedal assembly 10 to a motor vehicle. The arms 20 of the pedal assembly 10 extent towards the vehicle driver. In the present embodiment, the pedal assembly 10 includes two arms 20 having a rounded end portion 21.

Figure 3:
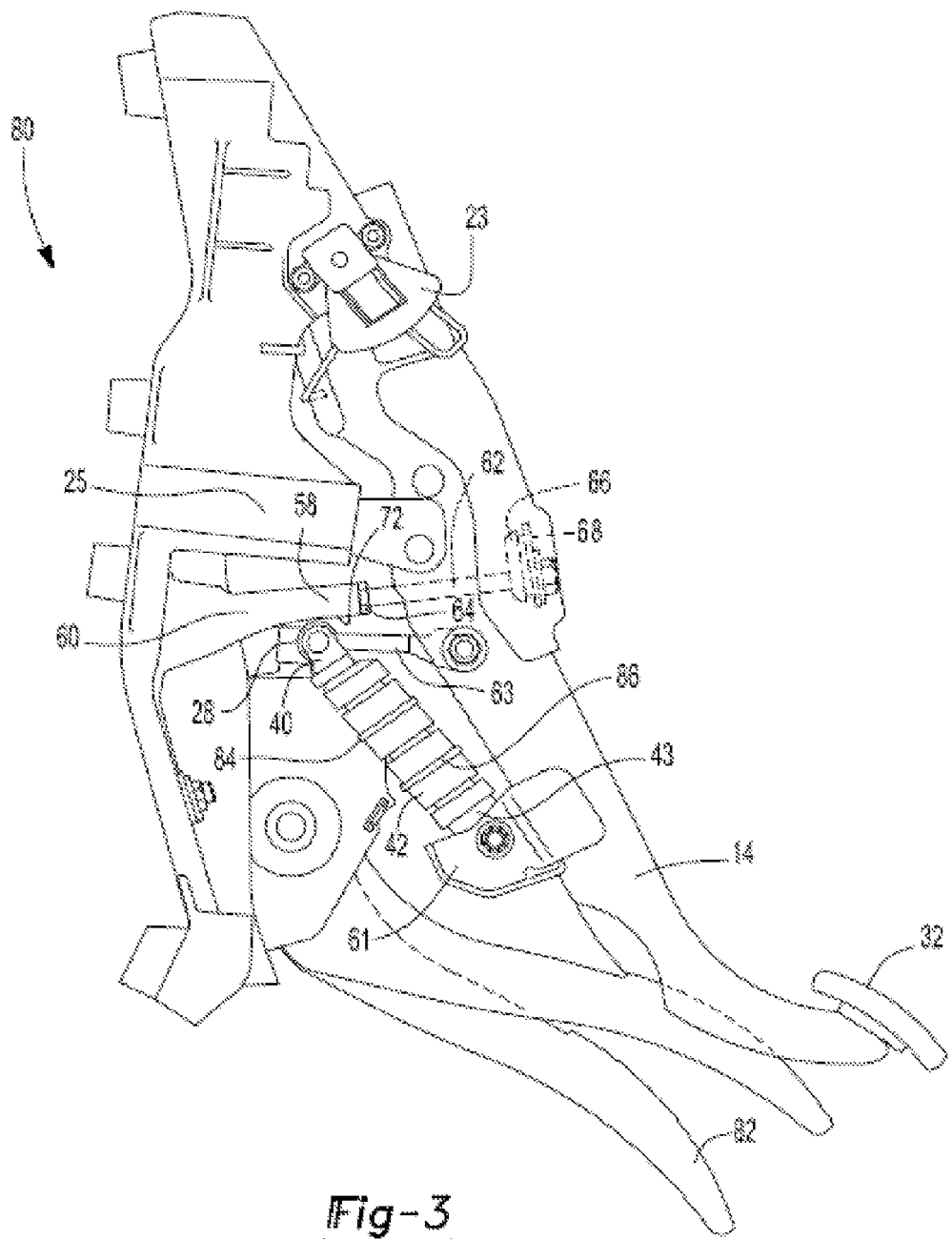
FIG. 3 is a perspective view of an alternative embodiment of the pedal assembly having a non-contacting position sensor.

In an alternative embodiment as shown in FIG. 3, a pedal assembly 80 is provided having a biasing member or spring 42 used in connection with a fixed leg 61 and a movable leg 63. A spring 42 extends between spring support 43 and the pivoting roller support 40 generating a biasing force against roller 28. A cam surface 72 is provided including an up stop bolt 62. The support 60 includes an upper portion 58 wherein the bolt 62 connects to the support 60 by means of the opening or acceptor 64. The bolt 62 extends up from the cam 58 and protrudes through the pedal arm 14 to set the home position for the sensor 23. Coupling nut 66 secures the bolt 62 to the cam setting the proper home position of the pedal arm 14. A damper 68 is disposed between the pedal arm 14 and the coupling nut 66. The damper 68 cooperates with the up stop bolt 62 to dampen or cushion movement of the pedal arm 14 when returning to the released pedal arm position.

The spring 42 is connected to a roller support 40. The roller support 40 is connected to a roller 28 operable to roll on the cam surface 72 of the support 60. The rolling of the roller 28 on the cam surface 72, the bolt 62, and the depression of the spring 42 all work together to simulate the feel of a traditional brake pedal.

The spring 42 is made of rubber, an elastomer or wire or alike. In the present embodiment, the spring 42 is a natural rubber compression spring. The natural rubber compression spring 42 adds hysteresis to further simulate the feel of a conventional brake system. The elastomer could be combined with plastic or steel rings 84, 86. As shown in FIG. 3, cylindrical rings 84, 86 may be provided in the spring 42. The cylindrical rings 84, 86 prevent the spring from collapsing. Radial cuts or protrusions in the spring 42 are added to retain the cylindrical rings 84, 86 thereby preventing the spring 42 from collapsing.

Furthermore, the cross section of the spring 42 may vary throughout its length to provide varying load during compression. Grooves, chamfers and radii reduce the initial spring force, but allow for any compression set effect which the spring may undergo throughout the life of the spring 42.

A brake rod may be attached to the pedal arm at the aperture 44. The brake rod is toggled so that in aggressive braking situations the brake rod may be used to actuate the brakes of the vehicle.

Figure 4:
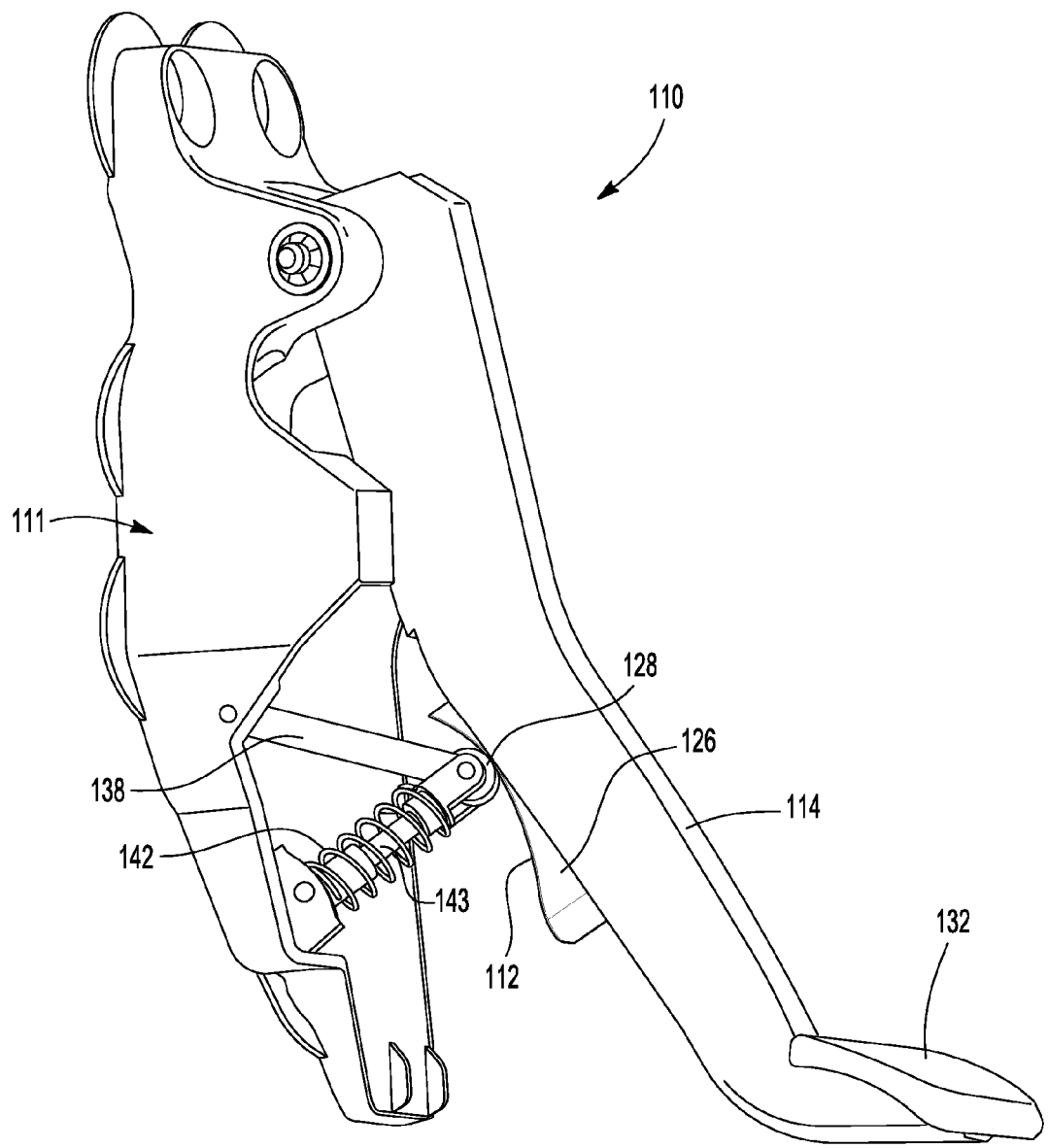
FIG. 4 is a perspective view of a third embodiment of the pedal assembly having a non-contacting position sensor.

FIG. 4 illustrates a third embodiment, shown as pedal assembly 110. A cam support 126 is disposed on the underside of the pedal arm 114. A telescoping support member 143 is pivotally mounted to support bracket 111. A biasing spring 142 surrounds the support member 143. A roller 128 is attached to the distal end of the support member 143. The spring 142 biases the roller 128 against the curved cam surface 112. A movable leg 138 is pivotally mounted to the support bracket 111, and is additionally attached to the distal end of the support member 143. Similar to the previous embodiments, depression of the brake pedal 132 causes compression of the spring 142 and support member 143, and further causes the roller 128 to travel along the curved cam surface 112. The roller 128 enables reduced friction and wear related to traveling along the curved cam surface 112. The vehicle driver feels a force when depressing the pedal 132 due to the compression of the spring 142. A desired response force may be achieved by determining the stiffness of the spring 142, the curvature of the cam surface 112, and the orientation of the support member 143 and movable leg 138.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various embodiments may be combined to form further embodiments of the invention.

What is claimed is:

1. A pedal assembly comprising:
   a bracket;
   a pedal arm having a first end connected to the bracket to pivot about a first axis and an opposed free end supporting a pedal;
   an elongate follower having a first end and a second end, the first end pivotally attached to one of the bracket and pedal arm at a location spaced from the first axis to pivot about a second axis;
   a cam surface on the other one of the bracket and pedal arm for cooperating with the second end of the follower;
   a compressible spring member having a first end and a second end, the first end pivotally attached to the same one of the bracket and pedal arm that the first end of the follower attaches to, and the second end pivotally connected to the follower at a location spaced apart from the second axis, wherein the spring member biases the second end of the follower against the cam surface; and an elongate upstop extending from the bracket through the pedal arm to set a pedal release position of the pedal arm, whereby pivoting the pedal arm in a pedal apply direction relative to the bracket causes the second end of the follower to traverse the cam surface rotating the follower about the second axis, thereby compressing the spring member to resist further rotation of the pedal arm, and pivoting the pedal arm in a pedal release direction is limited to a maximum rotation position provided by the upstop.

2. The pedal assembly of claim 1, further comprising a roller disposed at the second end of the follower and contacting the cam surface to reduce friction.

3. The pedal assembly of claim 1, wherein the spring member is a coil spring.

4. The pedal assembly of claim 1, wherein the spring member is an elastomeric spring.

5. The pedal assembly of claim 1, wherein the up stop is provided with an coupling nut in order to vary the maximum rotation angle of the pedal arm in the pedal release direction thereby setting a released pedal arm position.

6. The pedal assembly of claim 5, further comprising a damper cooperating with the up stop to dampen movement of the pedal arm when returning to the released pedal arm position.

* * * * *